United States Patent [19]

Kaniarz

[11] 4,451,981
[45] Jun. 5, 1984

[54] GLASS CUTTER

[75] Inventor: Alan Kaniarz, Detroit, Mich.

[73] Assignee: Inland Craft Products Co., Madison Heights, Mich.

[21] Appl. No.: 432,068

[22] Filed: Sep. 30, 1982

[51] Int. Cl.³ ............................................. C03B 33/12
[52] U.S. Cl. .................................. 30/123.3; 30/164.95
[58] Field of Search ............................ 30/164.95, 123.3

[56] References Cited

U.S. PATENT DOCUMENTS

| | | | |
|---|---|---|---|
| 778,023 | 12/1904 | Fells | 30/123.3 |
| 989,603 | 4/1911 | Hornig | 30/123.3 |
| 2,042,965 | 6/1936 | Rivard | 30/123.3 |
| 4,110,907 | 9/1978 | Einhorn | 30/164.95 |
| 4,287,669 | 9/1981 | Arai | 30/164.95 X |

Primary Examiner—Jimmy C. Peters
Attorney, Agent, or Firm—Harnss, Dickey & Pierce

[57] ABSTRACT

An improved glass cutter that automatically lubricates a cutting blade included therein is disclosed. The glass cutter comprises an end cap with an always open vent hole, a sleeve serving as a cutting oil reservoir, a barrel with annular grip, a cutter head, tube, wick, cutting blade, and spring. An upper portion of the cutter head is slidably engaged by a pair of opposed slots in a lower portion of the barrel to prevent rotation of the cutter head, and to limit the inward movement of the cutter head while the glass cutter is operated. The spring is disposed about the tube and pushes the cutter head and barrel apart when the glass cutter is unused. This in turn prevents fluid communication between the wick and the cutting blade by spacing the wick and cutting blade apart. When the glass cutter is operated, the barrel is pressed downwardly against the bias of the spring, sliding the tube and wick down the hollow of the cutter head, closing the space between the wick and cutting blade to establish fluid communication between the wick and cutting blade.

11 Claims, 4 Drawing Figures

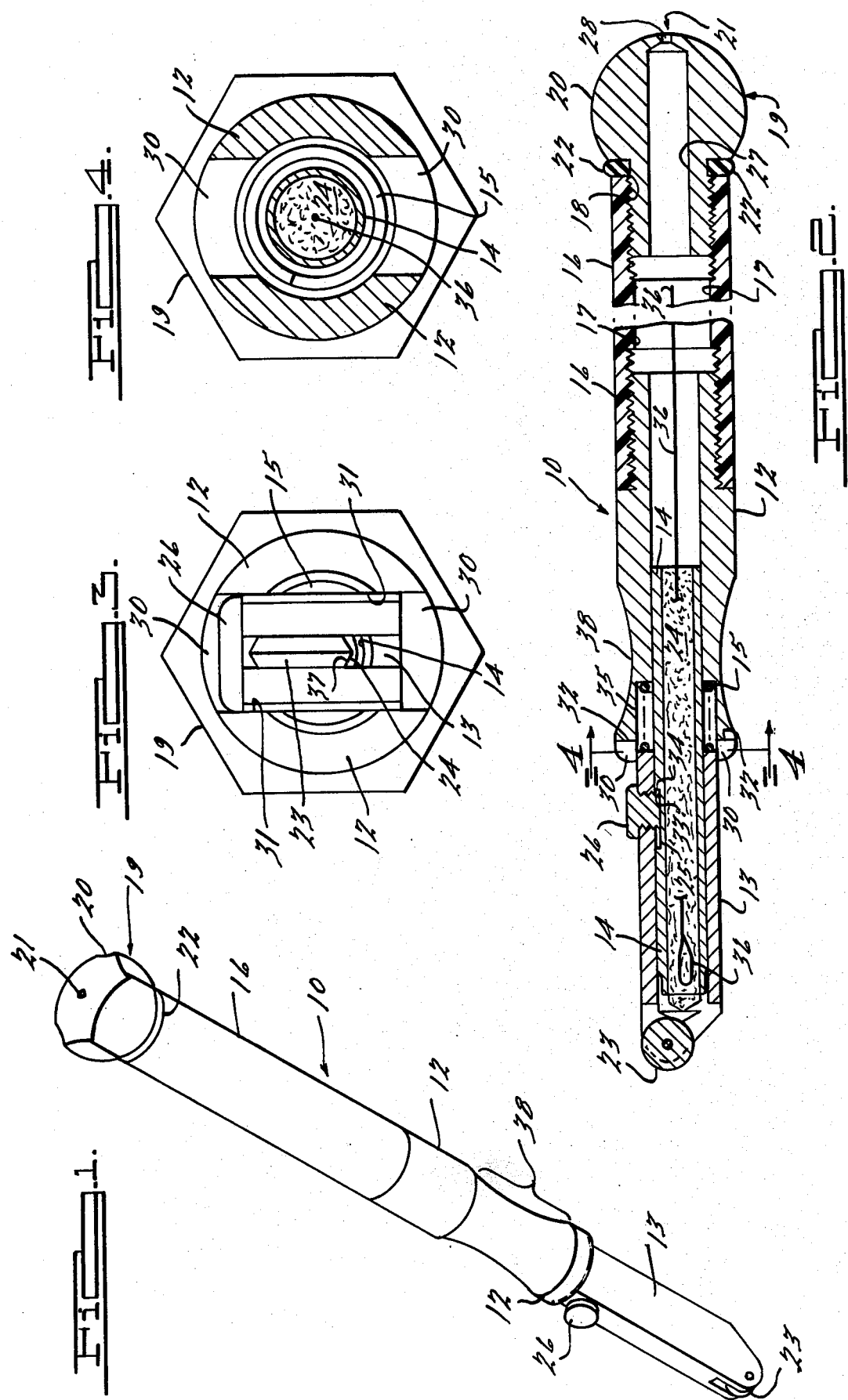

GLASS CUTTER

BACKGROUND AND SUMMARY OF THE INVENTION

The present invention relates to manually operable glass cutters and improvements thereof.

One procedure for cutting glass involves smearing cutting oil on the glass using a brush in the area where the glass is to be cut before the cut line is scribed with a glass cutter. An improvement over this procedure is taught in U.S. Pat. No. 4,287,669, which issued Sept. 8, 1981 to Arai and which disclosed a glass cutter that automatically lubricates its cutting blade.

The Arai glass cutter has decided advantages in eliminating the step of smearing cutting oil on the glass and the attendant mess caused thereby. The present invention, however, in turn provides still further improvements over the glass cutter disclosed in the Arai patent. These improvements as well as other features and advantages of the present invention which will become apparent from the subsequent description and appended claims taken in conjunction with the accompanying drawings.

BRIEF DESCRIPTION OF THE DRAWINGS

FIG. 1 is a perspective view of a glass cutter according to the present invention;

FIG. 2 is a longitudinal sectional view thereof;

FIG. 3 is an end view thereof from the cutting blade end of the glass cutter; and FIG. 4 is a cross-sectional view thereof taken along line 4—4 in FIG. 2.

DETAILED DESCRIPTION OF THE PREFERRED EMBODIMENTS

Referring now to the drawings, a glass cutter 10 in accordance with the present invention includes a generally tubular barrel 12 and a tubular cutter head 13 having a generally rectangular cross-section, both of which are hollow along their axis to accomodate a tube 14 therein. The tube 14 is rigidly and coaxially disposed within the central hollow formed in the barrel 12 and is coaxially and slidably engaged by the central hollow formed in the cutter head 13. The barrel 12 and the cutter head 13 are biased to push away from each other by means of a spring such as a helical compression spring 15 disposed about the tube 14 in a coaxial bore in the lower portion of the barrel.

The lower end of a sleeve 16 is rigidly and sealingly connected to the upper portion of the barrel 12, preferably by threaded engagement shown in FIG. 2. The sleeve 16 serves as a cutting oil reservoir 17. To fill the reservoir 17, the cutting oil is poured thereinto through a cutting oil inlet 18 provided in the upper end of the sleeve 16.

The sleeve 16 may be made of a transparent plastic material, such as polycarbonate made by General Electric Company and marketed under the trademark LEXAN, to give visual indication of the oil level in the cutting oil reservoir 17.

An end cap such as a bolt 19 covers the upper end of the sleeve 16. The bolt preferably has a generally spherical head 20 provided with six flats parallel to the axis of the glass cutter 10, said flats forming a hexagon when viewed from either end of the cutter. The bolt 19 is preferably threaded into the cutting oil inlet 18. A vent hole always open to atmosphere such as vent hole 21 which axially passes through the bolt 19, is provided in the end cap and serves to allow air to enter the reservoir 17 to take up the volume formerly occupied by the cutting oil as the oil is used up. An annular seal 22 fits on a threaded shank of the bolt 19 so the gap between the head 20 and the upper end of the sleeve 16 may be repeatedly and durably sealed.

A cutting blade 23 is rotatably mounted on the lower portion of the cutter head 13.

A wick 24 fits closely in the tube 14, projects from the lower portion of the tube 14, and is spaced apart from the cutting blade 23 as long as the barrel 12 and the cutter head 13 are pushed away from each other by the spring 15, such as when the glass cutter 10 is unused. The wick 24 is impregnated with cutting oil from the oil reservoir 17. The lower end of the wick 24 comes into contact or fluid communication with the cutting blade 23 when the glass cutter 10 is operated since the barrel 12 is pressed downwardly against the bias of the spring 15 and the tube 14 slides down the hollow of cutter head 13. Capillary action between the cutting blade 23 and the cutting oil in the wick 24 causes the cutting oil to flow onto the cutting blade, especially as the blade is rotated.

A longitudinal indentation 25 provided in the external surface of the tube 14 receives the tip 33 of a setscrew 26 projecting laterally through a threaded hole in the cutter head 13. The downward axial movement of the cutter head 13 away from the barrel 12 when the glass cutter is unused is limited by having the tip of the setscrew contact the upper end wall 34 of the indentation 25.

In operation, the bolt 19 need not be loosened since the vent hole 21 is always open to atmosphere. Instead, the cutting blade 23 is applied to the glass, and the barrel 12 is pressed downwardly against the bias of the spring 15. The tube 14 will slide down the hollow in the cutter head 13. The lower end of the wick 24 will come in contact or fluid communication with the cutting blade 23. Cutting oil, with which the wick 24 is impregnated, is applied to the cutting blade 23 and then to the glass to be scribed. The line along which to scribe the glass is thus smeared with cutting oil.

At the end of the scribing operation, the cutting blade 23 is lifted from the glass, and the spring 15 causes the lower end of the wick 24 to be removed from contact and fluid communication with the cutting blade 23. Once the wick 24 is spaced apart from the cutting blade 23, the cutting oil will not flow onto the cutting blade 23, so the glass cutter 10 may be put, for example, in a pocket or tool pouch.

The present invention offers several advantages. The vent hole 21 is sufficiently small to minimize flow of cutting oil therethrough and is located so that no oil will trickle therethrough when the glass cutter is laying on a horizontal surface and the reservoir 17 is less than half full of oil. Yet, the vent hole 21 is sufficiently large so that when the glass cutter 10 is in use, air will enter reservoir 17. The proper size for the vent hole 21 is a function of the viscosity of the cutting oil and the strengths of the capillary action between the cutting oil and blade 23 and the cutting oil and vent hole 21. In a preferred embodiment, the vent hole 21 is coaxially located on the bolt 19 and has a first bore 27 opening upon the shank end of the bolt of fairly large cross-section which tapers down to a second bore 28 having a much smaller cross-section and opening to atmosphere at the head end of the bolt. Since the first bore 27 is appreciably larger in cross-sectional area than the second bore 28, it is the size of the second bore, which in the preferred embodiment is its cross-sectional area and length, that determines whether the glass cutter 10 is properly vented. The second bore 28 preferably has a diameter of 0.020 inches and a length of 0.020 inches.

The lower portion of the barrel 12 is provided with a pair of rectangularly shaped opposed slots 30 which transversely and partially intersect the bore of the barrel. The slots 30 are complementary to and slightly engage rectangular cross-section 31 of the upper portion of the cutter head 13 when the glass cutter 10 is unused and engage it more when the glass cutter 10 is operated. The slots 30 and rectangular cross-section 31 cooperate to prevent the cutter head 13 from swiveling or otherwise rotating while the glass cutter 10 is in use.

The rear surfaces 32 of the slots 30 limit inward movement of the cutter head 13 when the glass cutter 10 is operated by contacting the upper end of the cutter head 13. The large area of the contact thus provided permits relatively large operating forces to be applied to the glass cutter 10 by gripping the barrel 12. Gripping the barrel 12 instead of the cutter head 13 to apply relatively large forces has the advantage of permitting the operator to more easily see the cutting blade 23 to assure the glass is being cut where desired.

The barrel 12 is also provided with a gently tapered annular indentation or band 38 to form a finger grip. This finger grip band 38 helps prevent the operator's fingers from sliding off of the barrel 12 towards the cutting head 13, thereby permitting relatively large forces to be easily applied when the glass cutter 10 is operated.

The annular seal 22 of the present invention is preferably a neoprene rubber O-ring. Since the bolt 19 need not be opened and closed each time the glass cutter 10 of the present invention is used, but rather only to refill the reservoir 17, the O-ring of the present invention will be longlasting. Also, the glass cutter 10 can be used efficiently since the bolt 19 need not be opened and closed with each use.

The wick 24 in the present invention, which preferably is made of woven cotton cord, is replaceable. To facilitate replacement, the wick 24 may be provided with a leader 36 shown in FIG. 2 which is preferably stainless steel wire. One end of the leader 36 is firmly attached to and imbedded in the wick 24 for substantially the full length of the wick. The other end of the leader 36 projects out of the upper end of the wick 24 into the reservoir 17. The threaded engagement of the sleeve 12 to the barrel 13 shown in FIG. 2 also facilitates replacement of the wick 24 by permitting easy access to the leader 36. Thus, the leaklessly snug fit between the tube and barrel need not be disturbed to replace the wick 24.

The cutting blade 23 is preferably made of carbide, and preferably has an obtuse angle 37 shown in FIG. 3 of about 134 degrees. All other components not heretofore described are preferably made of steel, except for the bolt 19 and cutting head 13 which are preferably made of brass.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A glass cutter which comprises:
   an end cap having a vent hole;
   a sleeve, serving as a cutting oil reservoir and having an upper end covered by the end cap, and a lower end;
   a barrel, having a hollow passing coaxially therethrough, an upper portion rigidly and sealingly connected with the lower end of the sleeve, and a lower portion provided with a coaxial bore and a pair of opposed slots transversely and partially intersecting the bore;
   a tube having an upper and lower portion, the upper portion being rigidly and coaxially disposed within the hollow of the barrel;
   a tubular cutter head having a hollow, an upper portion and lower portion, the hollow coaxially and slidably engaging the lower portion of the tube, and the upper portion slidably engaged in the slots of the barrel to prevent relative rotation between the cutter head and barrel and to limit inward movement of the cutter head;
   a cutting blade rotatably mounted on the lower portion of the cutter head;
   a wick fitting closely in the tube having a lower end which projects slightly from the lower portion of the tube and which is in fluid communication with the cutting blade when the glass cutter is operated, and which is spaced apart from the cutting blade when the glass cutter is unused; and
   a spring disposed about the tube within the bore of the barrel and in contact with the upper portion of the cutter head, pushing the cutter head away from the barrel to interrupt fluid communication between cutting blade and the lower end of the wick when the glass cutter is unused.

2. The glass cutter of claim 1 wherein the external surface on the lower portion of the tube has a longitudinal indentation provided with an upper end wall, and wherein the cutter head has a threaded hole located radially outward of the longitudinal indentation of the tube, which further comprises:
   a setscrew, projecting laterally through the threaded hole of the cutter head into the longitudinal indentation of the tube, for slidably retaining the cutter head on the tube by having the setscrew contact the upper end wall of the longitudinal indentation when the glass cutter is unused.

3. The glass cutter in claim 1 wherein the end cap is a bolt having a shank and head, and wherein the vent hole passes coaxially through the bolt.

4. The glass cutter in claim 3 which further comprises a neoprene rubber O-ring sealingly positioned on the shank of the bolt between the sleeve and the head of the bolt.

5. The glass cutter in claim 3 wherein the vent hole is formed by communicating first and second bores, the first bore being appreciably larger in cross-sectional area than the second bore and opening on to the shank end of the bolt, and the second bore opening on to the head end of the bolt.

6. The glass cutter of claim 5 wherein the second bore of the bolt is approximately 0.020 inches in diameter and 0.020 inches in length, thereby allowing air to enter into the sleeve while minimizing the flow of cutting oil therethrough when the glass cutter is unused.

7. The glass cutter of claim 1 wherein the wick is provided with a leader to facilitate replacement of the wick, the leader being firmly attached to and imbedded in the wick and extending appreciably out of the upper end of the wick.

8. The glass cutter of claim 7 wherein the leader is stainless steel wire.

9. The glass cutter of claim 1 wherein the connection between the upper end of the barrel and the lower end of the sleeve is a threaded engagement.

10. The glass cutter of claim 1 wherein the barrel has an annular indentation to form a finger grip.

11. A glass cutter which comprises:
- a bolt having a shank, head, and vent hole, wherein the vent hole passes coaxially through the bolt and is formed by communicating first and second bores, the first bore being appreciably larger in cross-sectional area than the second bore and opening on to the shank end of the bolt, and the second bore opening on to the head end of the bolt;
- a transparent plastic sleeve, serving as a cutting oil reservoir and having an upper end covered by the bolt, and a lower end;
- a barrel having an annular indentation to form a finger grip, a hollow passing coaxially through the barrel, an upper portion threadedly engaged with the lower end of the sleeve, and a lower portion provided with a coaxial bore and a pair of opposed slots transversely and partially intersecting the bore;
- a tube having an upper and lower portion, the upper portion being rigidly and coaxially disposed within the hollow of the barrel, and the lower portion provided with a longitudinal indentation having an upper end wall;
- a tubular cutter head having a hollow, an upper portion, a lower portion, and a threaded hole, the hollow coaxially and slidably engaging the lower portion of the tube, the upper portion slidably engaging the slots of the barrel to prevent relative rotation between the cutter head and barrel and to limit inward movement of the cutter head, and the threaded hole located radially outward of the longitudinal indentation of the tube;
- a setscrew, projecting laterally through the threaded hole of the cutter into the longitudinal indentation of the tube, for slidably retaining the cutter head on the tube by having the setscrew contact the upper end wall of the longitudinal indentation when the glass cutter is unused;
- a cutting blade rotatably mounted to the lower portion of the cutter head;
- a wick fitting closely in the tube having a lower end which projects slightly from the lower end of the tube and which is in fluid communication with the cutting blade when the glass cutter is operated, and which is spaced apart from the cutting blade when the glass cutter is unused; and
- a spring disposed about the tube within the bore of the barrel and in contact with the upper portion of the cutter head, pushing the cutter head away from the barrel to interrupt fluid communication between cutting blade and the lower end of the wick when the glass cutter is unused.

* * * * *